Patented Oct. 8, 1946

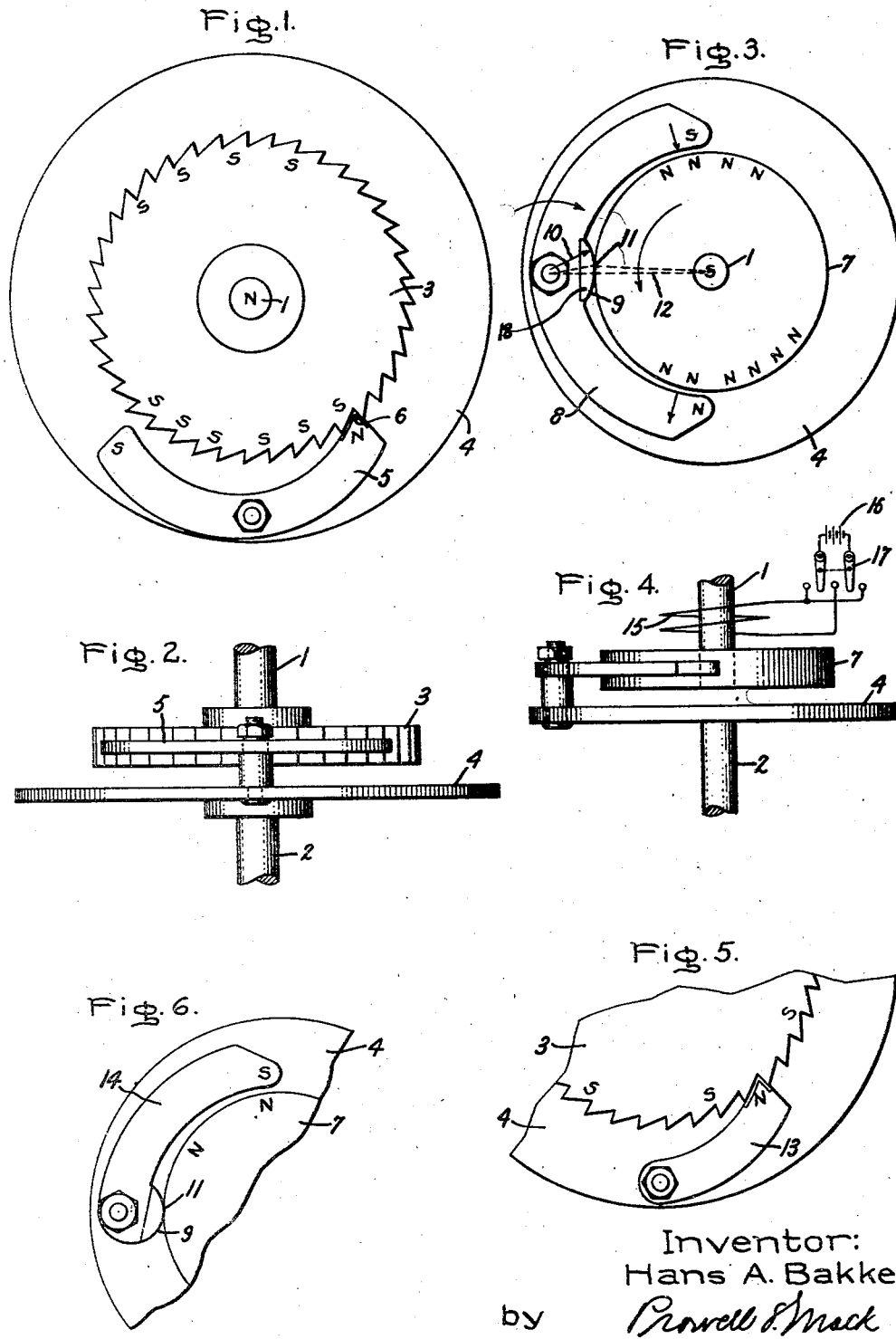

2,409,009

UNITED STATES PATENT OFFICE 2,409,009

ONE-WAY DRIVE WITH MAGNETIC LOCK

Hans A. Bakke, Swampscott, Mass., assignor to General Electric Company, a corporation of New York Application July 24, 1945, Serial No. 606,828

9 Claims. (Cl. 192—46)

My invention relates to rotary apparatus employing means in the nature of a pawl or clutch lever for preventing rotation in a given direction of rotation and in particular to magnetic means for retaining the lever in locking condition without the use of springs or weights and the like.

The features of my invention which are believed to be novel and patentable will be pointed out in the claims appended hereto. For a better understanding of my invention, reference is made in the following description to the accompanying drawing in which Fig. 1 is a side view and Fig. 2 a bottom view of a magnetic pawl mechanism embodying my invention. Fig. 3 is a side view and Fig. 4 a bottom view of a magnetic clutch lever mechanism embodying my invention. In Figs. 1 and 2 the magnetic levers are double-ended with the ends reversely polarized so as to produce both magnetic attraction and repulsion forces for holding the levers in place. Figs. 5 and 6 show side views of pawl and clutch levers having only one end which is used for magnetically retaining the lever in place.

Referring now to Figs. 1 and 2, 1 and 2 represent two relatively rotatable shafts in axial alignment. Shaft 1 carries a disk-shaped ratchet wheel 3 which is made of permanent magnet material and which is polarized radially such that its toothed periphery is at one polarity designated S and its hub part is at the opposite polarity designated N. The shaft 1 may be of magnetic material where that is convenient for polarizing purposes, as in Fig. 4. Shaft 2 carries a disk 4 preferably of nonmagnetic material with a double-ended pawl 5 pivoted thereon and cooperating with the teeth of ratchet wheel 3 to prevent relative clockwise rotation of wheel 3 relative to disk 4 but permitting the opposite relative rotary movement of these parts. The pawl lever 5 is a permanent magnet and is in the shape of an arc pivoted near its center so that its polarized ends are adjacent the periphery of ratchet wheel 3. The pawl end of lever 5 designated N is polarized opposite to the polarity at the periphery of ratchet wheel 3 so that there is attraction between these parts at this end of lever 5. The opposite or tail end of lever 5 thus has a polarity the same as the periphery of wheel 3 designated S and hence there is repulsion between these parts at such end of lever 5. By reason of these magnetic forces the lever 5 is retained in operating or locking position with its pawl end against ratchet wheel 3. However, there is sufficient clearance between the lever 5 and wheel 3 to allow the lever 5 to rock on its pivot when wheel 3 is turned counter-clockwise relative to disk 4 so that its pawl end rides over the ratchet teeth. It is thus seen that the ratchet pawl is at all times retained in position to prevent relative rotation of the parts in one direction but allowing their relative rotation in the opposite direction. No springs or weights are required and it is immaterial if the pawl be rotated below, above, or to either side of the ratchet wheel 3.

The degree of polarization of the parts for this purpose may be relatively low so that there is little chance that the magnetic forces will ever become insufficient for the purpose described during the life of the apparatus, and where low friction is important the magnetic forces should be no more than amply sufficient to retain the pawl 5 against wheel 3 under all conditions. It is to be noted that any unbalanced weight of pawl 5 about its pivot point is not sufficient to influence its operation. If desired, the contacting surface of the pawl end of lever 5 or the contacting surface of the ratchet wheel 3 may be made of nonmagnetic material to reduce friction and magnetic back pull on the ratchet wheel 3 to a minimum. Such expedient is indicated at 6 on pawl lever 5.

In Fig. 1 there is the possibility that after an advance of wheel 3 relative to disk 4, the advance will stop with the pawl end of lever 5 resting on wheel 3 somewhere between two teeth, in which case wheel 3 can rotate backward a distance up to the distance between its teeth. Practically all such small backward rotation can be eliminated by using the one-way clutch of Figs. 3 and 4 where the magnetic principles of Figs. 1 and 2 are again employed.

In Figs. 3 and 4, parts 1, 2, and 4 are similar to those of Figs. 1 and 2. The polarized ratchet wheel of Fig. 1 is replaced by a polarized magnetic wheel 7 having a smooth periphery. Adjacent wheel 7 is a permanent magnet locking lever 8 pivoted to disk 4 much as in Fig. 1. However, the polarized ends of such lever do not contact the periphery of wheel 7. The lever has a curved cam surface at 9 near its pivot which contacts with the periphery of wheel 7. This curved surface may be that of a circle whose center is slightly above the pivot point of the lever. For instance, the arrow 10 may represent the radius of the circular surface 9. As thus arranged it will be evident that as lever 8 is rotated clockwise on its pivot point, the surface of 9 will approach the periphery of wheel 7. Lever 8 is urged in a clockwise direction of rotation about its pivot by the magnetic force of repulsion between the lower N pole end of 8 and polarized wheel 7, and also by the magnetic force of attraction between the upper S pole of 8 and wheel 7. Surface 9 is arranged to contact the periphery of wheel 7 at about point 11 where the upper dotted lines drawn from the pivot points of 8 and 7 meet. The lower dotted line 12 is a straight line drawn between these pivot points to indicate better the position of the contact point 11.

It is now evident that with lever 8 urged in a clockwise direction by the magnetic forces, wheel 7 cannot be turned counterclockwise because it is locked from counterclockwise rotation by the binding clutching action at point 11. The arrows in Fig. 3 indicate the direction of rotation of the parts which produce locking. However, wheel 7 can rotate clockwise because this tends to rotate lever 8 counterclockwise to separate the contacting surfaces at 11 and relieve the binding. Thus there is provided a one-way clutch that permits relative rotation between wheels 4 and 7 in one direction only. To change this direction of rotation, lever 8 can be removed and turned over so that the contact point 11 will come below instead of above line 12. Also, the points of attraction and repulsion between lever 8 and wheel 7 will be interchanged as they should be for proper action of such reverse assembly arrangement.

In Fig. 1 it will be necessary to reverse both the ratchet wheel 3 and pawl lever 5 to reverse the direction in which relative rotation is permitted. As assembled in Fig. 3 wheel 4 can rotate counterclockwise relative to wheel 7 only. The polarized outer ends of lever 8 do not contact with wheel 7 and if desired the contacting surface 9 of the lever may be provided on an insert 18 of hardened nonmagnetic material.

In many cases it will be sufficient to make the locking levers 5 and 8 of Figs. 1 and 3 single-ended as shown at 13 and 14 in Figs. 5 and 6 respectively. In Figs. 5 and 6 the levers are maintained in locking position by magnetic attraction. In some cases where only magnetic attraction is used as in Figs. 5 and 6, one part such as the wheels 3 and 7 may be made of magnetic material but not polarized, while the other part such as levers 13 and 14 will be permanent magnets, and in which case they will generally be magnetized to a higher constant strength than where both parts are permanent magnets.

It is to be noted that the permanent magnet lever 5, Fig. 1, and the correeesponding levers in the other figures have their maximum holding force when in the locking position, whereas in a spring pressed pawl type of ratchet device the spring has its maximum tension and therefore produces maximum friction when the magnet pawl or lever is in a position furthest from the locking position. It is desirable that the maximum urging of the pawl or locking lever to locking position occur when the pawl or lever is performing its locking action. As a consequence, the magnetic pawl or locking lever can be designed to produce much less friction and wear than a spring pressed pawl as ordinarily used. It is also possible to provide for unlocking and locking the one-way drive from a remote point as, for example as indicated, in Fig. 4. In Fig. 4 I have shown a stationary polarizing coil 15 for the wheel 7 arranged to be connected to a direct current source 16 through a reversing switch 17. Assuming the wheel 7 is polarized as in Fig. 3, the one-way drive previously explained is effective. To release the clutch and permit relative rotation of parts 7 and 8 in either direction, switch 17 is closed in the proper direction to reverse the radial polarization of wheel 7, whereupon the N pole of lever 8 will be attracted and the S pole thereof repelled, thereby rotating lever 8 counterclockwise to a declutching condition. When the previous one-way drive is again desired, switch 17 is reversed to repolarize the wheel 7 to its original condition. By the proper choice of magnetic material for wheel 7, the wheel will retain a sufficient amount of permanent magnetism so that it will be unnecessary to keep switch 17 closed for either of such conditions of polarization of wheel 7.

It is to be noted that in no case is the magnetic force employed as a driving force between any relatively rotatable parts. Any torque transmitted is transmitted mechanically through mechanical contacting parts, and the magnetic force is used merely to perform a locking function and hence these magnetic locking facilities may be kept small and inexpensive.

It is to be understood that while the parts 3 and 4 in Figs. 1 and 2, for example, are both shown as being rotatable in order to show that the one-way drive may be included in a drive train, either of such parts may be stationary and where I use the expression "relatively rotatable" I mean to include any of these arrangements.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A one-way drive comprising a wheel member made of magnetic material, and a lever pivotally mounted adjacent said wheel member, said lever having a locking part adapted to make contact with said wheel member when the lever is in one position to lock said member against rotation in one direction relative to said lever, said lever being rotatable on its pivot away from such locking position, said lever including a permanent magnet cooperating magnetically with said wheel to bias said lever toward its locking position.

2. A one-way drive comprising a wheel member made of magnetic material, and a lever member of magnetic material pivoted adjacent said wheel and movable on its pivot between a position where it locks the wheel against rotation in one direction relative to said lever and a position where such locking action does not exist, at least one of said magnetic members being polarized to produce a magnetic force between said members which biases said lever member about its pivot toward said locking position.

3. A one-way drive comprising a wheel member made of magnetic material and polarized radially, a locking lever for said member pivoted adjacent its periphery and having a part which contacts with said wheel to lock the wheel against rotation in a given direction relative to said lever, said lever being movable about its pivot between wheel locking and unlocking positions, said lever including a permanent magnet having mangetic poles of opposite magnetic polarity adjacent the periphery of said wheel whereby forces of magnetic attraction and magnetic repulsion exist between said wheel and lever magnet, both of said forces being in directions to rotate said lever on its pivot toward wheel locking position.

4. A one-way drive comprising a wheel member made of magnetic material and polarized radially, a locking lever for said member pivoted near its center and extending generally tangentially about a peripheral portion of said wheel, said lever having a part adapted to contact with and lock the wheel from rotation in a given direction of rotation relative to said lever, said lever being movable about its pivot between wheel locking and wheel releasing positions, said lever including a permanent magnet with its opposite poles adjacent the periphery of said wheel on opposite sides of the pivot point of the lever such that magnetic forces of attraction and repulsion occur between the lever magnet and the polarized wheel both tending to rotate said lever on its pivot to wheel locking position, the contacting surfaces between said wheel and lever locking part being such that when there is relative rotation between the wheel and lever opposite to said given direction the lever is moved on its pivot in a direction to release the wheel.

5. A one-way drive comprising a ratchet wheel formed of magnetic material, and a permanent magnet ratchet pawl pivoted adjacent the periphery of said ratchet wheel with its pawl end magnetically biased against the ratchet surface of said wheel.

6. A one-way drive comprising a ratchet wheel of magnetic material polarized radially, a permanent magnet ratchet pawl lever pivoted between its pole piece ends with its pawl end resting against the ratchet surface of said wheel and its other end closely spaced from the ratchet surface of said wheel, said pawl lever being polarized such that its pawl end has a polarity opposite to that of the ratchet surface of said wheel whereby said pawl is biased by both attraction and repulsion magnetic forces about its pivot to pawl locking position with respect to said wheel.

7. A one-way drive comprising a wheel of magnetic material with a smooth periphery, a locking lever for said wheel pivoted adjacent its periphery with a cam locking and releasing surface resting against the periphery of said wheel such that relative rotation of said wheel and locking lever in one direction tends to rotate the lever to produce a cam wheel locking action, to lock the parts against such rotation, and relative rotation of the wheel and lever in the opposite direction releases the cam locking action and permits such rotation, said locking lever including a permanent magnet which cooperates with the magnetic wheel to produce a magnetic force tending to rotate said locking lever to the cam locking position.

8. A one-way drive comprising a wheel having a smooth periphery, said wheel being made of magnetic material and polarized radially, a locking lever pivoted adjacent the periphery of said wheel and having a cam adapted to contact with the periphery of said wheel such that rotation of the lever about its pivot in one direction forces the cam against the wheel and rotation of the lever about its pivot in the opposite direction withdraws the cam from the surface of said wheel, said lever including a permanent magnet having poles of opposite magnetic polarity lying on opposite sides of the pivot point of said lever and adjacent the periphery of said wheel, said magnet and wheel being so relatively polarized that the resulting forces of attraction and repulsion between them tends to rotate said lever in a direction to force the cam against the wheel to lock the same against rotation in a given direction, such magnetic forces being insufficient to prevent rotation of the wheel in the opposite direction, this latter operation causing the lever to be driven through the cam to release the wheel.

9. A one-way drive comprising a wheel member made of magnetic material and adapted to be polarized radially, a lever member which includes a permanent magnet pivoted adjacent the periphery of said wheel and movable on its pivot to and from contact locking position with said wheel to prevent relative rotation of the wheel and lever in one direction of rotation only when the lever is in the locking position, said permanent magnet lever being magnetically biased to one or the other of said positions depending upon the direction of radial polarization of said wheel, a coil for radially polarizing said wheel, and an energizing circuit for said coil including switching means for determining the direction in which said wheel will be radially polarized by said coil.

HANS A. BAKKE.